United States Patent [19]

Samonek

[11] Patent Number: 4,893,414
[45] Date of Patent: Jan. 16, 1990

[54] APPARATUS FOR MEASURING VIDEO CASSETTE TAPE USAGE

[76] Inventor: Michael E. Samonek, 2318 S. Overlook Rd., Cleveland Heights, Ohio 44106-3107

[21] Appl. No.: 90,940

[22] Filed: Aug. 31, 1987

[51] Int. Cl.⁴ .............................................. G01B 3/00
[52] U.S. Cl. ........................................ 33/501; 33/494; 33/733; 33/476; 33/482
[58] Field of Search ................. 33/476, 482, 494, 501, 33/571, 128, 168 R

[56] References Cited

U.S. PATENT DOCUMENTS

| | | | |
|---|---|---|---|
| D. 141,882 | 7/1945 | Matson | D10/62 |
| 1,564,964 | 12/1925 | Knieling | 33/128 |
| 2,593,914 | 4/1952 | Palitto | 33/482 |
| 2,912,763 | 11/1959 | Loewe et al. | 33/128 |
| 2,946,127 | 7/1960 | Loewe | 33/128 |
| 3,173,212 | 3/1965 | Fredrickson | 33/494 |
| 3,259,987 | 7/1966 | Weyer | 33/494 |

FOREIGN PATENT DOCUMENTS 616080  1/1949  United Kingdom .................. 33/476

Primary Examiner—William A. Cuchlinski, Jr.
Assistant Examiner—Patrick R. Scanlon
Attorney, Agent, or Firm—George J. Coghill

[57]   ABSTRACT

A method and apparatus is disclosed for determining the amount of taping time used and/or remaining on standard VHS and Beta format video tape cassettes. Multiple scales are organized onto a single multi sided card having a corresponding number of corners. In the preferred embodiment there are five scales, one scale each for the three standard VHS taping speeds, and two for the standard BETA taping speeds. The scales start and end inwardly of the corners that are adjacent the scales.

6 Claims, 2 Drawing Sheets

APPARATUS FOR MEASURING VIDEO CASSETTE TAPE USAGE

BACKGROUND OF THE INVENTION

1. Field of the Invention

This invention relates generally to the field of measurement, and more particularly relates to a method and apparatus for measuring tape usage on standard video tape cassettes.

2. Description of the Prior Art

Recently, the use of home video recording devices has become widespread and very popular. In general, these home video systems utilize cassettes which generally comprise a plasic box containing a magnetic recording tape, with a "supply" reel and a "take-up" reel as is commonly understood in the industry. On a "blank", unused cassette, the tape is all wound onto the supply reel. As actual taping progresses, the tape is unwound from the supply reel as it passes a recording head, and then it winds around the "take-up" reel. There are two popular types of cassettes, or formats, one designated as "VHS" and the other as "BETA". From the users point ov view, the main difference between these two formats is the size and shape of the cassettes.

A typical home user will eventually encounter a situation requiring the determination of how much actual recording time remains on a cassette so that the end of a television program, for example, is not "cut off" because the cassette has reached the end of the tape before the end of the program. And, there has never been a convenient device of method of determine this.

Presently, both types of cassettes have clear plastic windows to allow the user to see the tape build-up on one or both of the reels to determine how much tape has been used already, or conversely, how much tape is still available for taping, but even after seeing the tape on the exposed reel(s), it is difficult to accurately determine how much tape has actually been used, how much is still available for further recording, how much taping time this actually represents.

Another difficulty in determining how much actual taping time remains on a cassette derives from the fact that typical video recording device can be selectively operated at more than one "speed". BETA type machines can be operated at two different speeds, and VHS machines can be operated at three different speeds. Basically, this means that the linear speed of the tape passing the recording head can be faster or slower at the user's selection. Thus, any determination of how much actual taping time is remaining on a cassette is a function of the "speed" that the machine is used at. If a higher speed is used there will be less total recording time available for any given amount of tape, as opposed to uses at a lower speed for the same amount of tape.

Other difficulties in providing such a device and method is the cost of making a device that would retain its measuring integrity after various types of abuse and/or damage.

Until this present invention, there has never been an acceptable device or method available that can inexpensively and accurately make such measurements for both types of formats, at any of the currently used speeds, and which protects and preserves the integrity of the measurements even after abuse, even partial destruction or mutilation of the device as may be encountered in use.

SUMMARY OF THE INVENTION

In the preferred embodiment the invention comprises:

a thin, flat, multi-sided card having multiple edges and a corresponding number of corners with two of said corners adjacent each edge. It has measuring scales printed radially adjacent multiple ones of the edges, with graduated markings ranging from zero to a maximum. The scales are centrally located adjacent the edges starting and ending laterally inward from the corners adjacent thereto.

The method comprises the steps of: selecting one of multiple scales from a multi edged, multi cornered card having graduated scales printed adjacent multiple ones of said edges, wherein the selected scale starts and ends inwardly of the corners immediately adjacent the selected scale; aligning the selected scale radially with the tape on the reel; aligning an index associated with the selected scale with the outside diameter of a reel of a video cassette; and reading the taping time remaining directly from the scale.

BRIEF DESCRIPTION OF THE DRAWINGS

The invention can be more readily understood by reference to the accompanying DRAWING FIGURES in which.

DESCRIPTION OF THE PREFERRED EMBODIMENT

Figure 1:
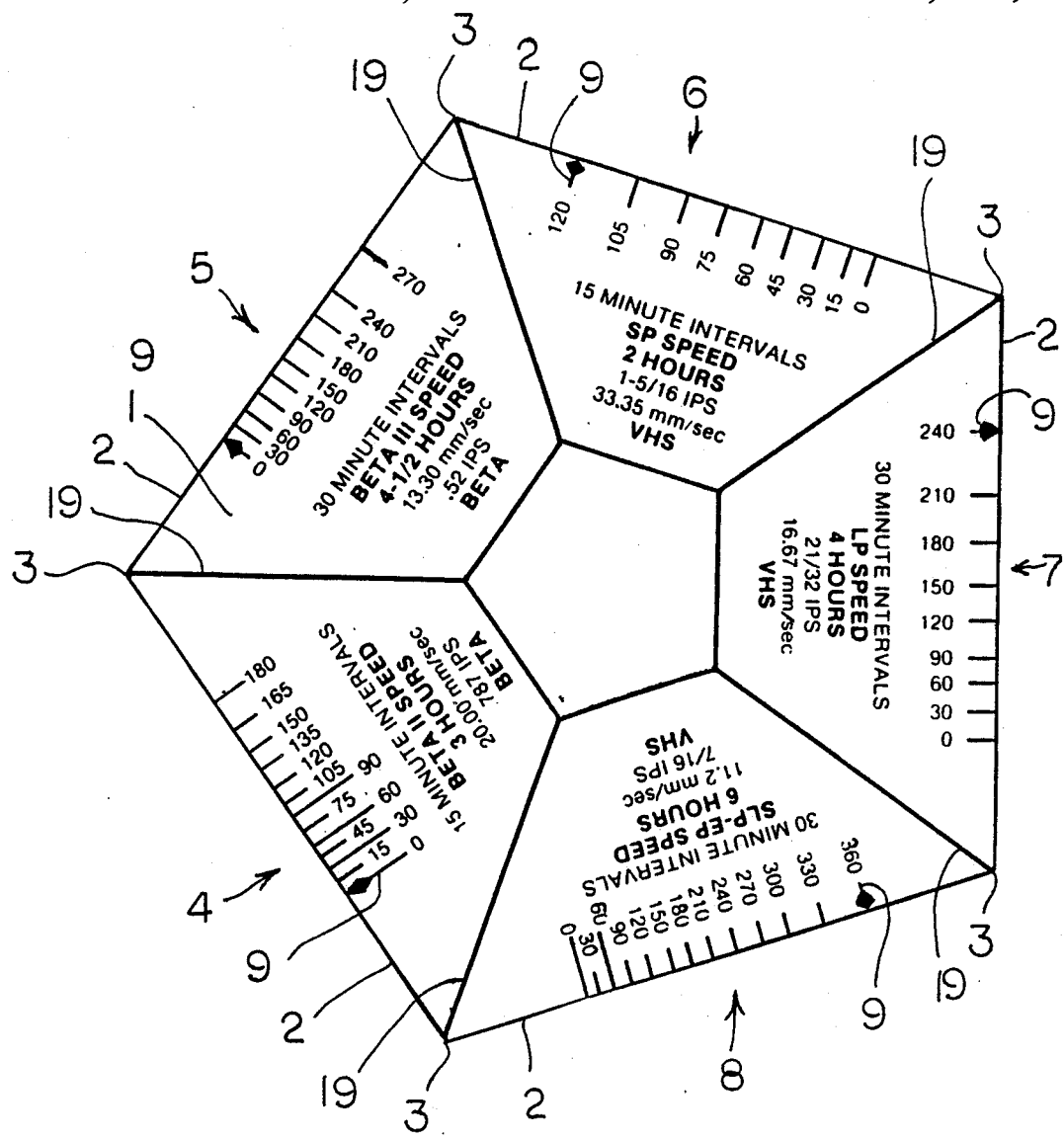
FIG. 1 depicts a topological view of a measurement device for VHS and BETA video cassettes.

With reference to FIG. 1, the device comprises a thin unitary card 1 having multiple equally sided edges 2 and a corresponding number of corners 3. In this particular embodiment, the card is pentagonal having five straight edges 2 and five corners 3. Each edge 2 has two of the corners 3 adjacent thereto.

Multiple graduated scales 4, 5, 6, 7, and 8 are printed on the card 1, centrally located on, aligned with, and adjacent each edge 2. In this preferred embodiment there are five such scales. Three of the scales 6, 7, and 8 are designated by means of printed legends for use on VHS cassettes at one each of the three standard VHS taping speeds, and two of the scales 4 and 5 are designated via appropriate legends for use with BETA cassettes at one each of the two standard BETA taping speeds. As thus organized, the card 1 is divided by printed lines 19 into five trapezoidal segments with the longer base of each segment corresponding to one each of the straight edges 2.

Indexing arrows 9 are provided on the scales 4, 5, 6, 7, and 8 to assist the user in the set up. As will be more fully described below with regard to the use of the device in actual measurements, the arrows are provided at the maximum graduations for the VHS scales 6, 7, and 8 and at the "zero" graduations for the BETA scales 4 and 5.

The device is used to measure the build-up of tape on one of the reels of a video tape cassette. Thus, the graduated marking correspond to various amounts of remaining taping time on standard cassettes as a function of the actual tape build-up on one of the reels at one each of the different possible taping speeds for each format. The spacing of the graduations is therefore not linear due to the well recognized fact that as more tape is transfered to the take-up reel, progressively fewer revolutions of the take-up reel, and thus fewer tape layers, are required to use up the same amount of recording time. Conversely, a progressively greater number of revolutions of the supply reel occur to provide the same amount of taping time from the tape on the supply reel. As should be recognized then, the radial thickness of the tape on a reel changes more for a given amount of taping time when there is less total tape wound onto it. The actual non-linear spacing of the graduations can be determined by running a tape and measuring the build-up at the proper selected time intervals, or it can be determined mathematically as is well known in the art.

For the VHS cassettes, the scale graduations are provided from "zero" to an appropriate maximum as follows: 15 minute intervals for the two hour mode; and 30 minute intervals for both the four hour and six hour modes. For the BETA cassettes, the graduations are provided from zero to an appropriate maximum in 15 minute intervals for the three hour mode and 30 minute intervals for the four and one half hour mode. Smaller or larger intervals could be provided.

As suggested above, the information most commonly desired by a user appears to be the taping time remaining on a cassette, and therefore to the extent possible the scales 4, 5, 6, 7, and 8 are organized to make this "remaining time" measurement most convenient. It is best to measure the radial thickness of the tape build-up on "less full" reel since the build-up changes more on the less full reel than it does on the fuller reel for the same amount of taping time, and the measurement will be more accurate. Thus, for use with VHS cassettes which have windows for both the supply reel and the take-up reel, the graduations and indexing arrows are arranged to facilitate this remaining time measurement from the take-up reel so that accuracy is improved for the longer programs. However, for the BETA format cassettes which have a window only for the supply reel build-up, the measurement, of necessity, must be made of the tape on the supply reel.

All of the scales 4, 5, 6, 7, and 8 start and end laterally inward from the two corners 3 adjacent thereto. Thus, the dimension of each edge 2 is greater than the thickness of tape build-up intended to be measured by the scale. For the current VHS formats the edge dimension is greater than 1.13 inches long, and for the current BETA format cassettes the edge dimension is greater than 0.865 inches long. In actual practice, the edges 2 are all conveniently made two inches long.

Because of the particular configuration, with the scales 4, 5, 6, 7, and 8 starting and ending inwardly of the adjacent corners 3, the flat edges 2 and scales 4, 5, 6, 7, and 8 themselves are protected from abuse, and mutilation by the corners 3. The corners 3 extend radially further than the scale portions of the device and thus the areas more significantly affected by abuse will be at the corners 3 themselves and not along the more central parts of the edges 2 where the scales are located. If and when the card does get mutilated, this mutilation will have a reduced tendency to obliterate or distort the scale markings, and hence have a reduced tendency to affect the accuracy of the measurements. This allows a greater range of materials to be used in making the device and it is not so critical to make it from a highly wear and abuse resistent material. This in turn can mean the utilization of possibly less expensive, thinner materials to be used in the manufacture of the device.

Thus, the card 1 can be made on a paper or paperboard substrate. It can also be plastic laminated to provide additional stiffness, and protection, from moisture, dirt and abuse.

In addition, the pentagonal shape contributes to making the device small and easy to store and use, while still providing all of the desired scales on one unitary device.

Other information convenient to the user can also be provided to the user such as linear tape speed in Metric or English units.

The respective segments of the card devoted to a particular format and/or speed could be color coded to facilitate ease of recognition for the different formats and different speeds.

Figure 2:
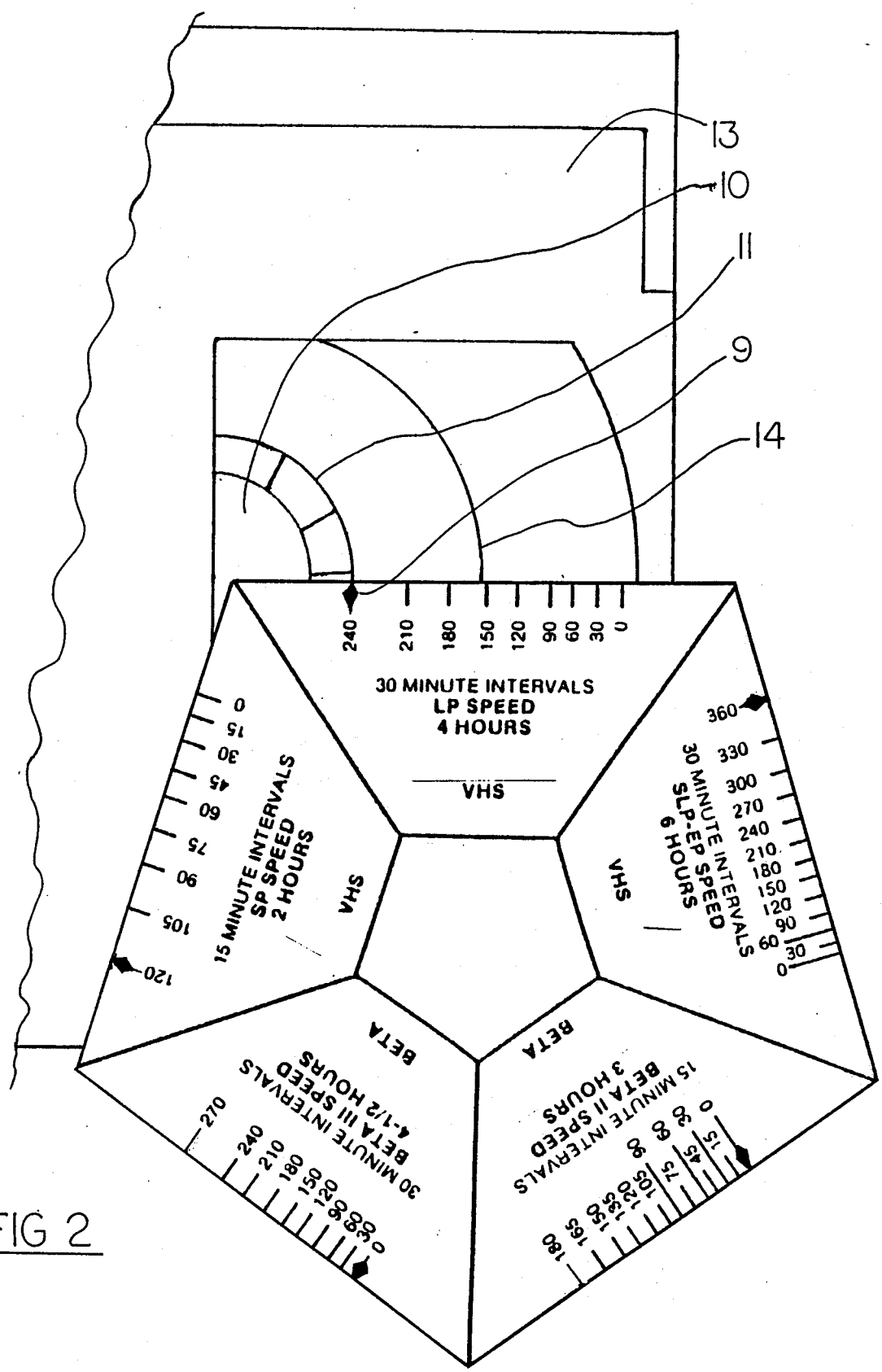
FIG. 2 shows the device of FIG. 1 being used to measure the amount of taping time remaining on a typical VHS format video cassette.

In order to use the device, for example on VHS cassettes 13 as depicted in FIG. 2, the proper "VHS scale" 6, 7, or 8 is selected for use with the user chosen taping speed, and the selected scale is positioned radially with respect to the take-up reel 10 with the indexing arrow 9 of this scale aligned with the outside diameter 11 of the take-up reel 10. The amount of tape build-up can then be read or estimated directly in remaining time units from the scale as the point on the scale aligned with the outside diameter 14 of the tape build-up.

With BETA cassttes, as noted above, it is not possible to measure the tape on the take-up reel since there is no window exposing the take-up reel tape. There is only a window exposing the supply reel tape. Thus the indexing arrow 9 on these scales 4 and 5 is aligned with the "zero" graduation, so that when the arrow 9 on these scales 4 and 5 is aligned with the outside diameter of the supply reel, the best measurement possible can be similarly made directly in remaining time units as the point on the scale aligned with the outside diameter of the tape build-up on the supply reel.

Having described my invention I claim:

1. A device for measuring the taping time remaining on a video cassette comprising:
    a thin pentagonal card having five straight edges and five corners;
    measuring scales printed adjacent each of the edges wherein two of the scales have graduated markings corresponding to the remaining taping time one each for the different taping speeds of a BETA format video cassette, and three of the scales have graduated markings corresponding to the remaining taping time one each for the different taping speed of a VHS format video cassette, wherein the scales are centrally located on each edge, and start and end laterally inward of the corners, and the graduated markings range from zero to a maximum;
    a printed designation of the taping speed each scale is calibrated to measure; and
    indexing means on the scales wherein: the indexing means for the VHS scales is located at the maximum graduated marking, and the indexing means for the BETA scales is located at the zero marking.

2. The device of claim 1 which is made on a laminated paper substrate.

3. The device of claim 2 wherein the VHS scales and the BETA scales are differently color coded.

4. A device for measuring the taping time remaining on a video cassette comprising:

a thin, flat, multi-sided card having multiple straight edges and a corresponding number of corners with two of said corners adjacent each edge; and measuring scales printed adjacent multiple ones of the edges and having graduated markings ranging from zero to a maximum and a designation associated with each scale indicating the format and taping speed such scale is calibrated to measure; and indexing means for each of said scales located at either the zero graduation or the maximum graduation as a function of the format the scale is calibrated to measure;

wherein the scales are centrally located adjacent the edges starting and ending laterally inward from the corners adjacent thereto, the graduated markings correspond to the remaining taping time as a function of tape build-up on a reel of the video cassette, and the device is made on a thin substrate.

5. The device of claim 4 wherein the indexing means for individual ones of the scales is located at the zero graduation if the scale is designated to measure the remaining taping time on BETA format tapes and at the maximum graduation if the scale is designated to measure the remaining taping time on VHS format tapes.

6. The device of claim 5 wherein the card is pentagonal and comprises 2 scales designated for BETA format tapes, and 3 scales designated for VHS format tapes.

* * * * *